US012194745B2

(12) United States Patent
Hiruma

(10) Patent No.: US 12,194,745 B2
(45) Date of Patent: Jan. 14, 2025

(54) RECORDING DEVICE

(71) Applicant: SEIKO EPSON CORPORATION, Tokyo (JP)

(72) Inventor: Daisuke Hiruma, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 18/168,941

(22) Filed: Feb. 14, 2023

(65) Prior Publication Data

US 2023/0256738 A1 Aug. 17, 2023

(30) Foreign Application Priority Data

Feb. 16, 2022 (JP) ................................ 2022-021888

(51) Int. Cl.

*B41J 2/14* (2006.01)
*B41J 3/407* (2006.01)
*B41J 23/12* (2006.01)
*B41J 25/00* (2006.01)

(52) U.S. Cl.

CPC ................ *B41J 2/14* (2013.01); *B41J 3/407* (2013.01); *B41J 23/12* (2013.01); *B41J 25/001* (2013.01); *B41J 2202/19* (2013.01)

(58) Field of Classification Search

CPC ..... B41J 2/14; B41J 3/407; B41J 23/12; B41J 25/001; B41J 2202/19; B41J 19/00; B41J 29/38; B41J 29/02

See application file for complete search history.

(56) References Cited

U.S. PATENT DOCUMENTS 5,867,188 A * 2/1999 Murayama .............. B41J 25/34
347/50

FOREIGN PATENT DOCUMENTS

JP 2007-276289 A 10/2007

* cited by examiner

*Primary Examiner* — Bradley W Thies

(74) *Attorney, Agent, or Firm* — WORKMAN NYDEGGER

(57) ABSTRACT

A recording device includes a sandwiching member coming into contact with a first guide shaft at a guide shaft-side contact surface and disposed between a carriage and the first guide shaft in a second direction and a cam member coming into contact with a first curved surface of the sandwiching member and configured to rotate about a first direction as a rotation axis relative to the carriage in a state of being engaged with the carriage. The cam member presses the first curved surface with the second curved surface slidably fitted to the first curved surface in the second direction and changes a position of the carriage relative to the sandwiching member in the second direction as a distance in the second direction of a position at which the second curved surface presses the first curved surface relative to the rotation axis changes along with rotation of the cam member.

11 Claims, 12 Drawing Sheets

RECORDING DEVICE

The present application is based on, and claims priority from JP Application Serial Number 2022-021888, filed Feb. 16, 2022, the disclosure of which is hereby incorporated by reference herein in its entirety.

BACKGROUND

1. Technical Field

The present disclosure relates to a recording device.

2. Related Art

In a related art, various recording devices have been used. Among them, there is a recording device that forms an image by reciprocating a carriage including a head that discharges a liquid to a recording medium. For example, JP-A-2007-276289 discloses a recording device including a main carriage that is mounted on a carriage guide shaft and that reciprocates along the carriage guide shaft, and a sub-carriage that is provided with a liquid injection head and that is mounted on the main carriage. In a known recording device that forms an image by reciprocating a carriage having a head that discharges a liquid to a recording medium, such as the recording device described in JP-A-2007-276289, it is possible to change a posture of the carriage relative to the guide shaft. The recording device disclosed in JP-A-2007-276289 is capable of moving the sub-carriage relative to the main carriage and is capable of changing the posture of the sub-carriage relative to the carriage guide shaft.

In the recording device described in JP-A-2007-276289, eccentric cams are provided at positions in contact with cutout portions on both ends of the sub-carriage in an extending direction of the carriage guide shaft, and it is possible to change the posture of the sub-carriage relative to the carriage guide shaft by rotating the eccentric cams. However, shapes of contact portions between the cutout portions and the eccentric cams tend to vary due to manufacturing tolerances. That is, in the known recording device such as the recording device disclosed in JP-A-2007-276289, the posture of the carriage relative to the guide shaft may be destabilized due to manufacturing tolerances of components such as the guide shaft and the carriage.

SUMMARY

A recording device according to an aspect of the present disclosure for solving the problems described above includes a head configured to discharge a liquid, a carriage provided with the head and configured to reciprocate in a first direction, a first guide shaft configured to support the carriage reciprocably in the first direction, a sandwiching member disposed between the carriage and the first guide shaft in a second direction intersecting the first direction, the sandwiching member including a guide shaft-side contact surface formed on a first guide shaft side in the second direction and coming into contact with the first guide shaft and a first curved surface formed on a side opposite to that of the guide shaft-side contact surface in the second direction, and a cam member including a second curved surface slidably fitted to the first curved surface, the cam member being configured to rotate about the first direction as a rotation axis relative to the carriage in a state of being engaged with the carriage, wherein the cam member changes a position of the carriage relative to the sandwiching member in the second direction by pressing the first curved surface with the second curved surface in the second direction along with rotation of the cam member to change a distance in the second direction of a position at which the second curved surface presses the first curved surface relative to the rotation axis.

DESCRIPTION OF EXEMPLARY EMBODIMENTS

Figure 1:
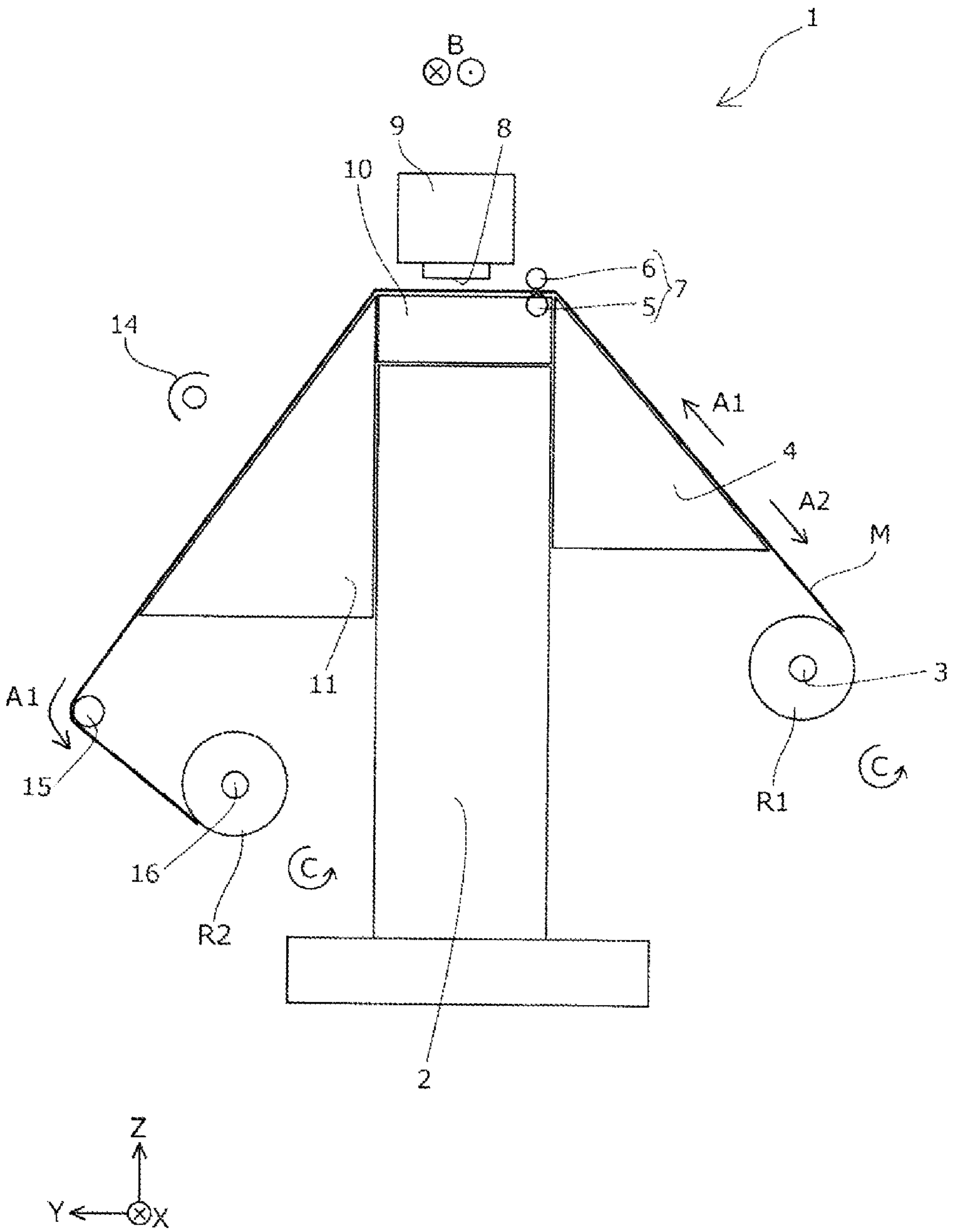
FIG. 1 is a schematic side view of a recording device according to Example 1 of the present disclosure.

First, the present disclosure will be schematically described.

A recording device according to a first aspect of the present disclosure for solving the problems described above includes a head configured to discharge a liquid, a carriage provided with the head and configured to reciprocate in a first direction, a first guide shaft configured to support the carriage reciprocably in the first direction, a sandwiching member disposed between the carriage and the first guide shaft in a second direction intersecting the first direction, the sandwiching member including a guide shaft-side contact surface formed on a first guide shaft side in the second direction and coming into contact with the first guide shaft and a first curved surface formed on a side opposite to that of the guide shaft-side contact surface in the second direction, and a cam member including a second curved surface slidably fitted to the first curved surface, the cam member being configured to rotate about the first direction as a rotation axis relative to the carriage in a state of being engaged with the carriage, wherein the cam member changes a position of the carriage relative to the sandwiching member in the second direction by pressing the first curved surface with the second curved surface in the second direction along with rotation of the cam member to change a distance in the second direction of a position at which the second curved surface presses the first curved surface relative to the rotation axis.

According to this aspect, the sandwiching member coming into contact with the first guide shaft at the guide shaft-side contact surface and disposed between the carriage and the first guide shaft in the second direction and the cam member coming into contact with the first curved surface of the sandwiching member and configured to rotate about the first direction as the rotation axis relative to the carriage in a state of being engaged with the carriage are included, and the cam member presses the first curved surface with the second curved surface slidably fitted to the first curved surface in the second direction and changes a position of the sandwiching member relative to the carriage in the second direction as the distance in the second direction of the position at which the second curved surface presses the first curved surface relative to the rotation axis changes along with rotation of the cam member. That is, the carriage is fitted to the first guide shaft via the sandwiching member and the cam member with the curved surfaces being slidable with each other. With such a configuration, even when there are manufacturing tolerances in any of the components, the recording device is less likely to be affected by the manufacturing tolerances when a posture of the carriage is changed. Therefore, destabilization of the posture of the carriage relative to the guide shaft due to manufacturing tolerances or the like can be curbed.

According to a recording device of a second aspect of the present disclosure, in the first aspect, a second guide shaft provided at a position different from that of the first guide shaft and configured to support the carriage reciprocably in the first direction is further included, and the carriage rotates about the second guide shaft as a rotation axis as the cam member changes a position of the carriage relative to the sandwiching member.

According to this aspect, the second guide shaft configured to support the carriage reciprocably in the first direction is provided at a position different from that of the first guide shaft. Thus, the posture of the carriage can be changed relative to the first guide shaft with the second guide shaft as a reference, the posture of the carriage can be easily changed, and the posture of the carriage can be stabilized.

According to a recording device of a third aspect of the present disclosure, in the first or second aspect, a curvature of the second curved surface is the same curvature as the curvature of the first curved surface.

According to this aspect, the curvature of the second curved surface is the same curvature as the curvature of the first curved surface. Thus, the posture of the carriage can be changed while a stable state of the posture of the carriage is maintained.

According to a recording device of a fourth aspect of the present disclosure, in any one of the first to third aspects, the sandwiching member comes into contact with the second curved surface at a constant position at the first curved surface regardless of the rotation of the cam member.

According to this aspect, the sandwiching member comes into contact with the second curved surface at a constant position at the first curved surface regardless of the rotation of the cam member. Thus, the posture of the carriage can be changed while a stable state of the posture of the carriage is maintained.

According to a recording device of a fifth aspect of the present disclosure, in any one of the first to fourth aspects, the sandwiching member is disposed at one position in a central region of three equal regions obtained by dividing the carriage into three equal portions in the first direction.

According to this aspect, the sandwiching member is disposed at one position in the central region of three equal regions obtained by dividing the carriage into three equal portions in the first direction. That is, a posture change unit of the carriage relative to the guide shaft, which includes the sandwiching member and the cam member, is at one position in the central region of the carriage. Thus, compared to a configuration in which a plurality of position change units is provided, the posture can be changed more easily and more accurately without variation.

According to a recording device of a sixth aspect of the present disclosure, in any one of the first to fifth aspects, the first curved surface is a concave curved surface, and the second curved surface is a convex curved surface.

According to this aspect, the first curved surface is a concave curved surface, and the second curved surface is a convex curved surface. With such a configuration, a recording device having a smaller and simpler configuration than that of a recording device in which the first curved surface is a convex curved surface and the second curved surface is a concave curved surface can be easily manufactured.

According to a recording device of a seventh aspect of the present disclosure, in any one of the first to sixth aspects, a pressing direction of the second curved surface against the first curved surface in the second direction is a direction toward a center of gravity position of the carriage in the second direction when seen in the first direction.

According to this aspect, the pressing direction of the second curved surface against the first curved surface in the second direction is the direction toward the center of gravity position of the carriage in the second direction when seen in the first direction. That is, since the cam member is engaged with the carriage, the cam member presses the carriage via the sandwiching member in a direction opposite to a direction in which the posture tends to change due to a weight of the carriage. Thus, it is possible to curb a change in the posture of the carriage in an unintended direction.

According to a recording apparatus of an eighth aspect of the disclosure, in any one of the first to seventh aspects, the first guide shaft is made of a material less likely to wear than that of the sandwiching member.

According to this aspect, the first guide shaft is made of a material less likely to wear than that of the sandwiching member. Although the first guide shaft is more difficult to replace than the sandwiching member, it is possible to curb wear of the first guide shaft by forming the first guide shaft with a material less likely to wear than that of the sandwiching member, and thus complexity of maintenance of the device can be curbed.

According to a recording device of a ninth aspect of the present disclosure, in any one of the first to eighth aspects, an eaves portion coming into contact with at least one of the first guide shaft and the cam member and protruding in the second direction is provided at the sandwiching member vertically above at least one of the first guide shaft and the cam member when seen in the first direction.

According to this aspect, the eaves portion coming into contact with at least one of the first guide shaft and the cam member and protruding in the second direction is provided at the sandwiching member vertically above at least one of the first guide shaft and the cam member when seen in the first direction. Thus, it is possible to curb dislodging and falling of the sandwiching member from the device.

According to a recording device of a tenth aspect of the present disclosure, in the ninth aspect, a protruding portion protruding in the second direction is provided at a position facing the eaves portion vertically below at least one of the first guide shaft and the cam member when seen in the first direction.

According to this aspect, the protruding portion protruding in the second direction is provided at a position facing the eaves portion vertically below at least one of the first guide shaft and the cam member when seen in the first direction. Thus, at least one of the first guide shaft and the cam member can be vertically sandwiched between the eaves portion and the protruding portion, and dislodging and falling of the sandwiching member from the device and position displacement of the first guide shaft and the cam member relative to the sandwiching member can be particularly effectively curbed.

According to a recording device of an eleventh aspect of the present disclosure, in any one of the first to tenth aspects, the sandwiching member includes a lubricant accommodation portion configured to accommodate a lubricant that improves sliding properties between the first guide shaft and the guide shaft-side contact surface.

According to this aspect, the sandwiching member includes the lubricant accommodation portion configured to accommodate a lubricant that improves sliding properties between the first guide shaft and the guide shaft-side contact surface. Thus, maintenance of the device can be facilitated by adopting a configuration in which, for example, the lubricant gradually leaks from the lubricant accommodation portion to between the guide shaft and the guide shaft-side contact surface.

Example 1

Exemplary examples of the present disclosure will be described below with reference to the accompanying drawings. First, an outline of a recording device 1 according to Example 1 of the present disclosure will be described with reference to FIG. 1. Note that in FIG. 1, some components are omitted for clarity of configuration. Here, in the drawings, an X-axis direction is a horizontal direction and a direction in which a rotation shaft of a holding unit 3 that holds a roll body R1 in which a recording medium M is wound in a roll shape extends; a Y-axis direction is a horizontal direction, a forward and rearward direction of the recording device 1, and a direction orthogonal to the X direction; and a Z-axis direction is a vertical direction. Additionally, hereinafter, an arrow direction is a + direction, and a direction opposite to the arrow direction is a − direction. For example, a vertical upward direction is a +Z direction, a vertical downward direction is a −Z direction, the front of the recording device 1 is a +Y direction, and the rear of the recording device 1 is a −Y direction.

A recording device 1 according to the example includes a main body 2, and includes a holding unit 3 that holds the roll body R1 in which the recording medium M is wound into a roll shape on a −Y direction side, which is the rear side of the main body 2. Additionally, in the recording device 1 according to the example, when the recording medium M is transported in a first direction A1 which is the so-called transport direction, the holding unit 3 having a rotation shaft in the X-axis direction rotates in a rotation direction C. Additionally, when the recording medium M is transported in a second direction A2 opposite to the first direction A1, which is the so-called reverse transport direction, the holding unit 3 having the rotation shaft in the X-axis direction rotates in a direction opposite to the rotation direction C. Note that although the example uses the roll body R1 wound so that the recording surface on which recording is performed faces outward, when the roll body R1 wound so that the recording surface faces inward is used, the holding unit 3 can rotate in a direction opposite to the rotation direction C to feed the recording medium M from the roll body R1.

Additionally, the recording device 1 according to the example includes a transport route for the recording medium M, which includes a medium support unit 4, a medium support unit 10, a medium support unit 11, and the like for supporting the recording medium M. Additionally, the recording device 1 includes a feeding roller pair 7 including a driving roller 5 and driven rollers 6 and serving as a transport unit for transporting the recording medium M in the first direction A1 and the second direction A2 in the transport route. Note that in the recording device 1 according to the example, the driving roller 5 is constituted by a roller that extends in a width direction B intersecting the first direction A1 and the second direction A2, and a plurality of driven rollers 6 are provided side by side in the width direction B relative to the driving roller 5 at positions facing the driving roller 5. However, the configuration of the transport unit is not limited thereto.

Additionally, the recording device 1 according to the example includes, at a position facing the medium support unit 10, a head 8 as a recording unit that includes a plurality of nozzles and discharges ink from the nozzles for recording, and a carriage 9 that can reciprocate in the width direction B with the head 8 mounted thereon. The carriage 9 of the example can change the posture relative to the main body 2. Note that in the recording device 1 according to the example, the first direction A1 at a position on the medium support unit 10 facing the head 8 is the +Y direction, the second direction A2 is the −Y direction, the width direction B that is a movement direction of the head 8 is a direction along the X-axis direction, and an ink discharge direction is the −Z direction.

With the configuration described above, the head 8 can perform recording by discharging ink from the nozzles (not illustrated) onto the transported recording medium M while reciprocating in the width direction B intersecting the first direction A1 and the second direction A2. The recording device 1 according to the example can form a desired image on the recording medium M by repeating the transporting of the recording medium M in the first direction A1 by a predetermined amount of transport and the discharging of ink while the head 8 is moved in the width direction B in a state in which the recording medium M is stopped.

Additionally, a heating unit 14 is provided at a position facing the medium support unit 11. Here, the heating unit 14 of the example is an infrared heater that irradiates the recording medium M that is transported with infrared rays. However, a configuration of the heating unit 14 is not limited thereto. For example, a nichrome wire heater built in the medium support unit 11 may be used.

Additionally, a guide bar 15 in which a contact portion with the recording medium M extends in the width direction B and a desired tension can be applied to the recording medium M is provided downstream of the medium support unit 11 in the transport direction A. However, a configuration without the guide bar 15 may be adopted.

Furthermore, a winding shaft 16 that winds the recording medium M transported in the transport direction A in a roll shape to form a roll body R2 is provided downstream of the guide bar 15 in the transport direction A. Note that in the recording device 1 of the example, the holding unit 3 and the winding shaft 16 have the same or similar configurations, and can support paper tubes that are the centers of rotation of the roll body R1 and the roll body R2 and rotate the paper tubes.

Here, as described above, the recording device 1 according to the example can change the posture of the carriage 9. Next, the carriage 9 and a posture changing mechanism of the carriage 9 will be described with reference to FIGS. 2 to 10.

Figure 2:
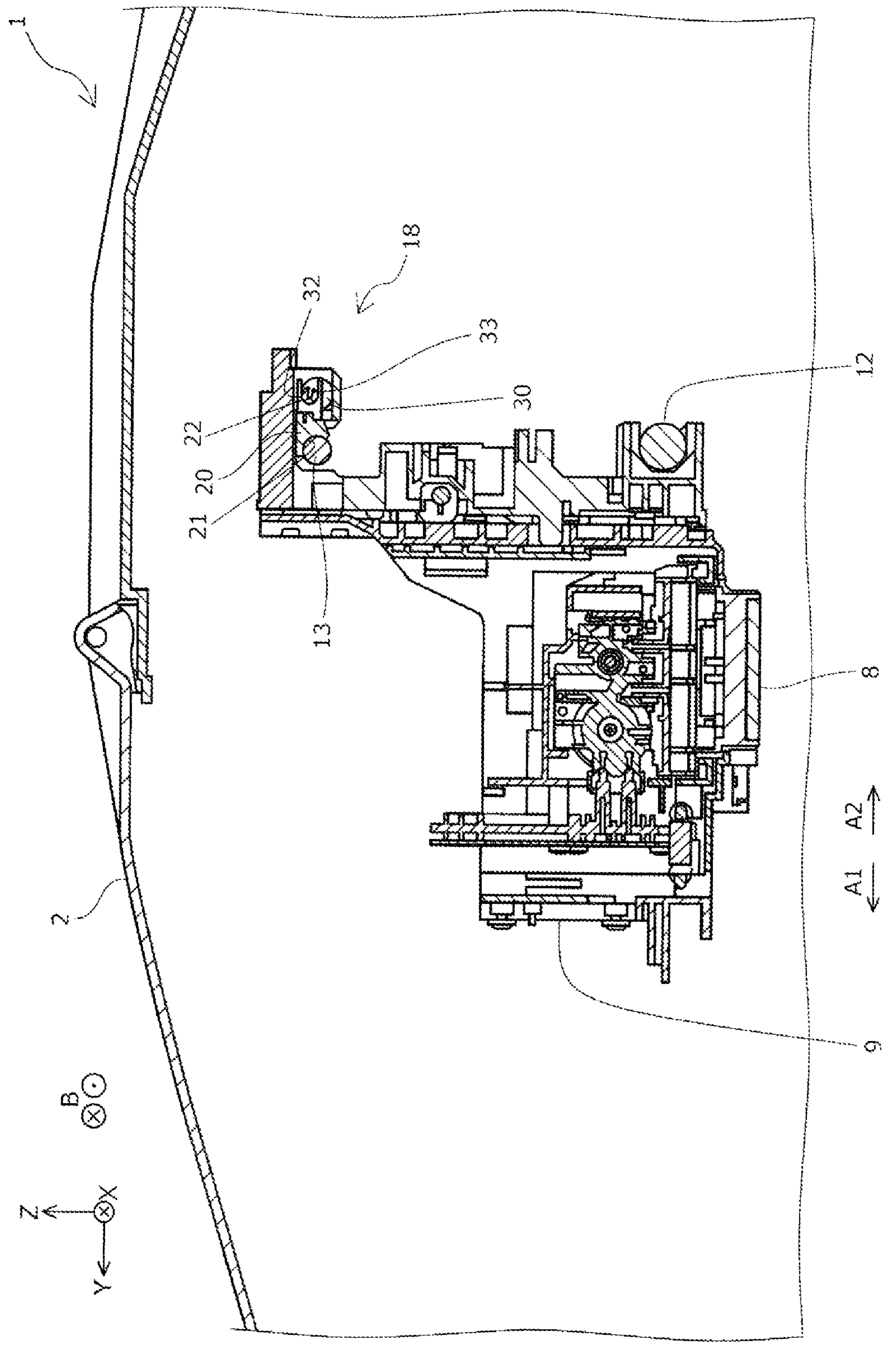
FIG. 2 is a side cross-sectional view of a periphery of a carriage of the recording device of FIG. 1.
Figure 3:
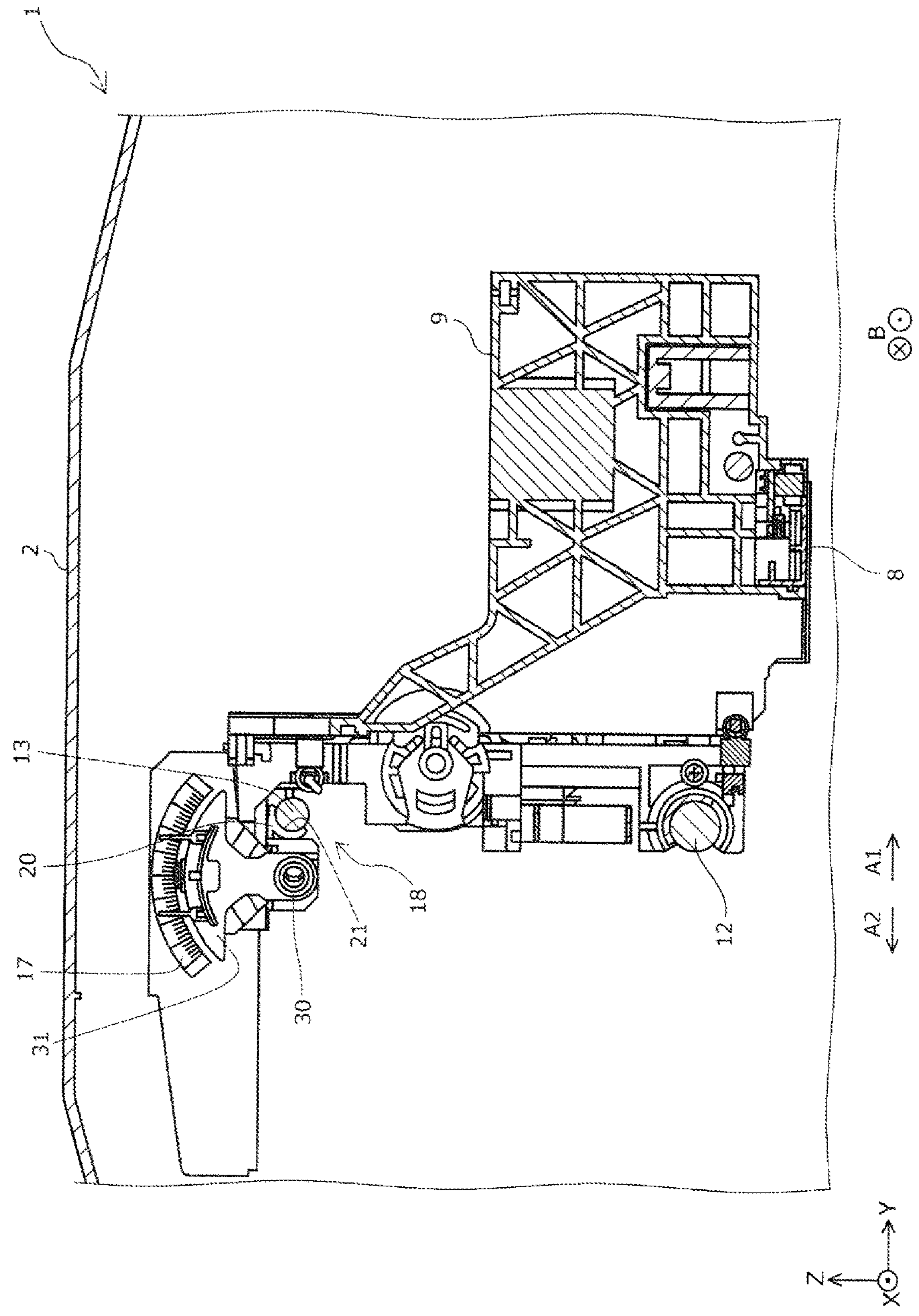
FIG. 3 is a side cross-sectional view illustrating the periphery of the carriage of the recording device of FIG. 1 when seen in a direction opposite to that of FIG. 2.

As illustrated in FIGS. 2 and 3, the recording device 1 of the example includes a first guide shaft 13 and a second guide shaft 12 that both extend in the width direction B inside the main body 2. The first guide shaft 13 is an auxiliary shaft, and the second guide shaft 12 is a main shaft. The carriage 9 can rotate about the second guide shaft 12 that is the main shaft as a rotation axis and change the posture relative to the main body 2 by changing the disposition relative to the first guide shaft 13 that is the auxiliary shaft.

As described above, the recording device 1 according to the example includes the head 8 configured to discharge ink that is a liquid, and the carriage 9 provided with the head 8 and configured to reciprocate in the width direction B (the X-axis direction) as the first direction, and the first guide shaft 13 configured to support the carriage 9 reciprocably in the width direction B. Furthermore, as illustrated in FIGS. 2 to 7, a sandwiching member 20 and a cam member 30 are provided as the posture changing mechanism of the carriage 9.

Figure 5:
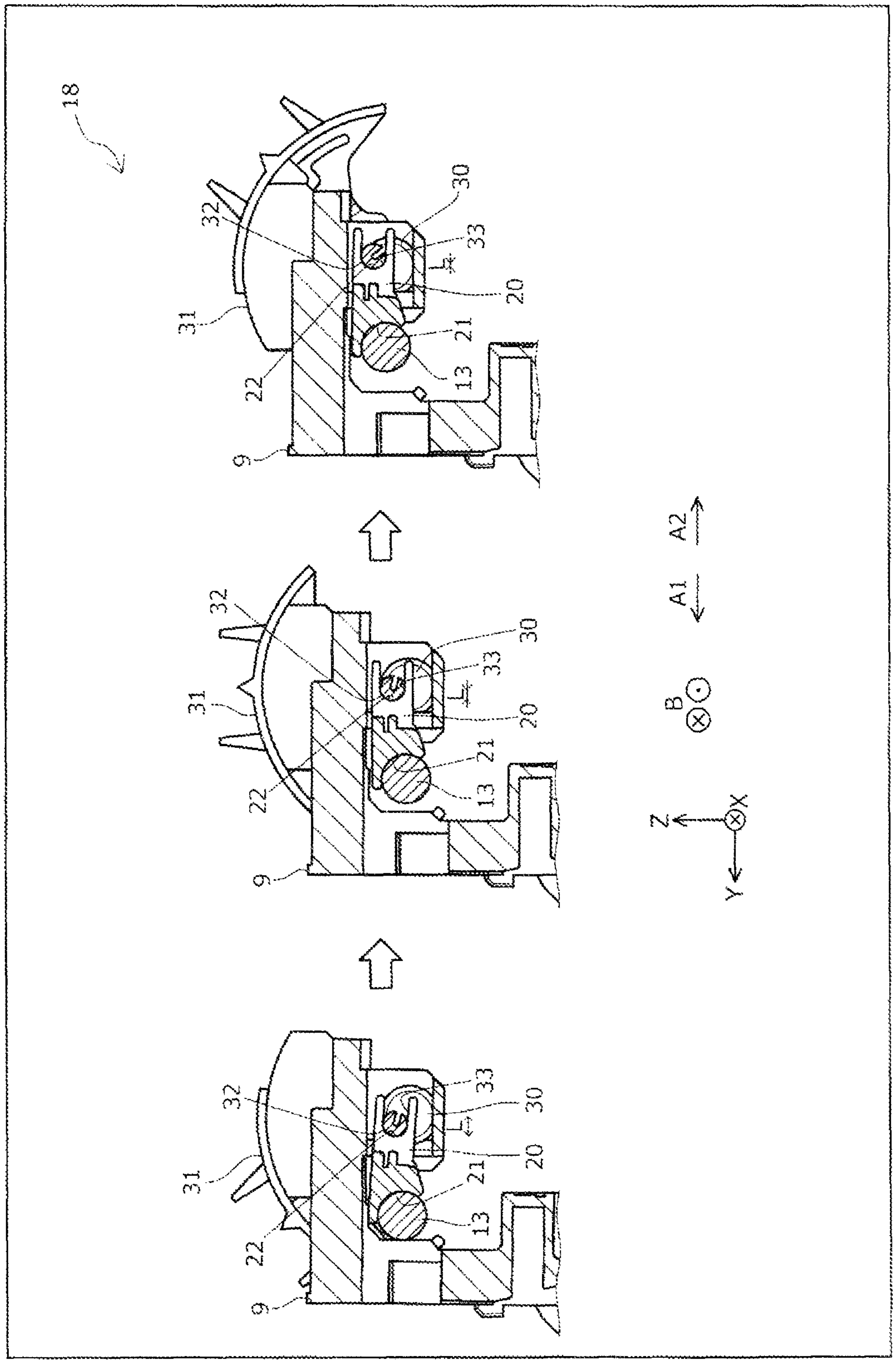
FIG. 5 is a side cross-sectional view illustrating a state in which a posture of the carriage of the recording device of FIG. 1 is changed.

Here, as illustrated in FIGS. 2 and 5, the sandwiching member 20 comes into contact with the first guide shaft 13 at a guide shaft-side contact surface 21 and is disposed between the carriage 9 and the first guide shaft 13 in the Y-axis direction as the second direction intersecting the width direction B. Additionally, as illustrated in FIGS. 2 and 5 and the like, the cam member 30 can come into contact with a first curved surface 22 on the side opposite to the guide shaft-side contact surface 21 of the sandwiching member 20 in the Y-axis direction and rotate about the width direction B as a rotation axis 33 relative to the carriage 9 in a state of being engaged with the carriage 9.

In further detail, as illustrated in FIG. 5, the cam member 30 presses the first curved surface 22 in the +Y direction with a second curved surface 32 slidably fitted to the first curved surface 22, and changes a position of the carriage 9 relative to the sandwiching member 20 and the first guide shaft 13 in the Y-axis direction as a distance L in the Y-axis direction of a position at which the second curved surface 32 presses the first curved surface 22 relative to the rotation axis 33 changes along with rotation of the cam member 30. In other words, the carriage 9 is fitted to the first guide shaft 13 via the sandwiching member 20 and the cam member 30 with the curved surfaces being slidable with each other. With such a configuration, even when there are manufacturing tolerances in any of the components, the recording device 1 according to the example is less likely to be affected by the manufacturing tolerances when the posture of the carriage 9 is changed. Therefore, the recording device 1 according to the example can curb destabilization of the posture of the carriage 9 relative to the first guide shaft 13 and the second guide shaft 12 due to the manufacturing tolerances or the like.

Here, the recording device 1 according to the example includes a fan-shaped part 31 that indicates a posture of the cam member 30 as illustrated in FIGS. 3 and 5, and a graduations formation unit 17 is provided in the main body 2 as illustrated in FIG. 3. Thus, a user can easily adjust the posture of the cam member 30 by rotating the fan-shaped part 31 and can easily grasp the posture of the cam member 30 by reading a graduation in the graduations formation unit 17. The left-side view of FIG. 5 illustrates the posture of the cam member 30 in which the distance L is the longest and the fan-shaped part 31 is most inclined in the +Y direction, and illustrates a state in which the carriage 9 is closest to the first guide shaft 13. The middle view of FIG. 5 illustrates an initial state of the posture of the cam member 30 in which the distance L is shorter than that in the left-side view of FIG. 5 and the fan-shaped part 31 is inclined neither in the +Y direction nor in the −Y direction, and illustrates a state in which the carriage 9 is farther from the first guide shaft 13 than in the left-side view of FIG. 5. The right-side view of FIG. 5 illustrates the posture of the cam member 30 in which the distance L is the shortest and the fan-shaped part 31 is most inclined in the −Y direction, and illustrates a state in which the carriage 9 is farthest from the first guide shaft 13.

As described above, the recording device 1 according to the example includes the second guide shaft 12 provided at a position different from that of the first guide shaft 13 and configured to support the carriage 9 reciprocably in the width direction B. Additionally, the carriage 9 rotates about the second guide shaft 12 as a rotation axis as the cam member 30 changes the position of the carriage 9 relative to the sandwiching member 20. Thus, the recording device 1 according to the example can change the posture of the carriage 9 relative to the first guide shaft 13 with the second guide shaft 12 as a reference, can easily change the posture of the carriage 9, and can stabilize the posture of the carriage 9.

Here, in the recording device 1 of the example, a curvature of the second curved surface 32 is the same curvature as the curvature of the first curved surface 22. Thus, the recording device 1 according to the example can change the posture of the carriage 9 while a stable state of the posture of the carriage 9 is maintained. Note that "the curvature of the second curved surface 32 is the same as the curvature of the first curved surface 22" does not mean sameness in the strict sense, but means that being substantially the same is sufficient. For example, manufacturing tolerances are allowed, and it is only required that the posture of the carriage 9 can be changed while a stable state of the posture of the carriage 9 is maintained without rattling.

Additionally, the guide shaft-side contact surface 21 also has the same curvature as that of the first guide shaft 13. Thus, in the recording device 1 according to the example, rattling of the carriage 9 relative to the first guide shaft 13 as the carriage 9 reciprocates in the width direction B is curbed. Note that "the same curvature" herein does not mean sameness in the strict sense, but means that being substantially the same is sufficient.

Additionally, in the recording device 1 of the example, the sandwiching member 20 comes into contact with the second curved surface 32 at a constant position on the first curved surface 22 regardless of the rotation of the cam member 30. Thus, the recording device 1 according to the example can change the posture of the carriage 9 while a stable state of the posture of the carriage 9 is maintained. Note that "come into contact with the second curved surface 32 at a constant position on the first curved surface 22" does not mean the same position in the strict sense, but means that a substantially constant position is sufficient. For example, it is only required that the posture of the carriage 9 can be changed while a stable state of the posture of the carriage 9 is maintained without rattling even when the contact position is slightly moved.

Figure 4:
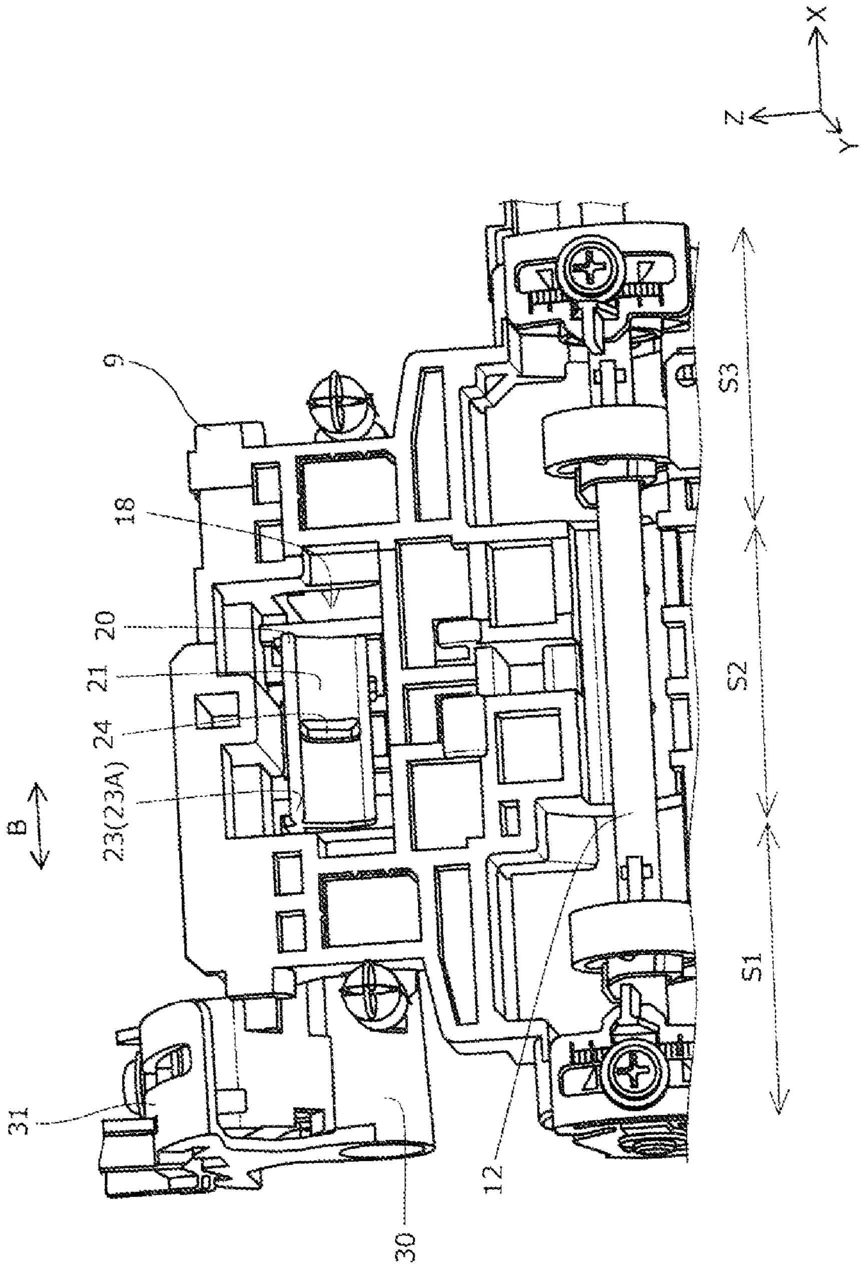
FIG. 4 is a perspective view of the carriage of the recording device of FIG. 1 when seen from the rear surface side.

Additionally, as illustrated in FIG. 4, in the recording device 1 according to the example, the sandwiching member 20 is disposed at one position in a central region S2 of regions S1, S2, and S3 obtained by dividing the carriage into three equal portions in the width direction B. In other words, in the recording device 1 according to the example, a posture change unit 18 of the carriage 9 including the sandwiching member 20 and the cam member 30 is at one position in the central region of the carriage 9. Thus, the recording device 1 according to the example can easily change the posture and can be more accurate without variation as compared with a configuration including a plurality of posture change units 18.

In the recording device 1 of the example, the first guide shaft 13 and the second guide shaft 12 are made of a metal, and the sandwiching member 20 in contact with the first guide shaft 13 is made of resin. In this way, the first guide shaft 13 may be made of a material less likely to wear than that of the sandwiching member 20. This is because the first guide shaft 13 is more difficult to replace than the sandwiching member 20, but it is possible to curb wear of the first guide shaft 13 by forming the first guide shaft 13 with a material less likely to wear than that of the sandwiching member 20, and thus complexity of maintenance of the device can be curbed.

Figure 7:
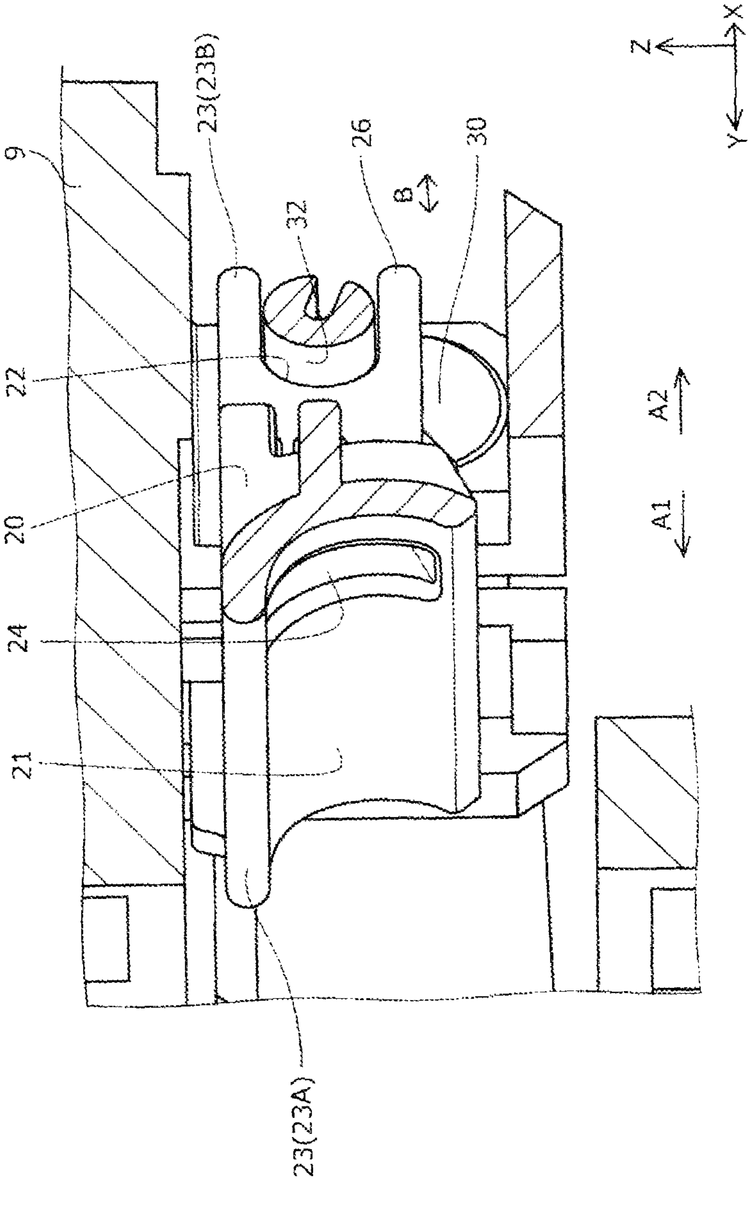
FIG. 7 is a perspective cross-sectional view of a contact portion between the sandwiching member and a cam member of the recording device of FIG. 1.
Figure 8:
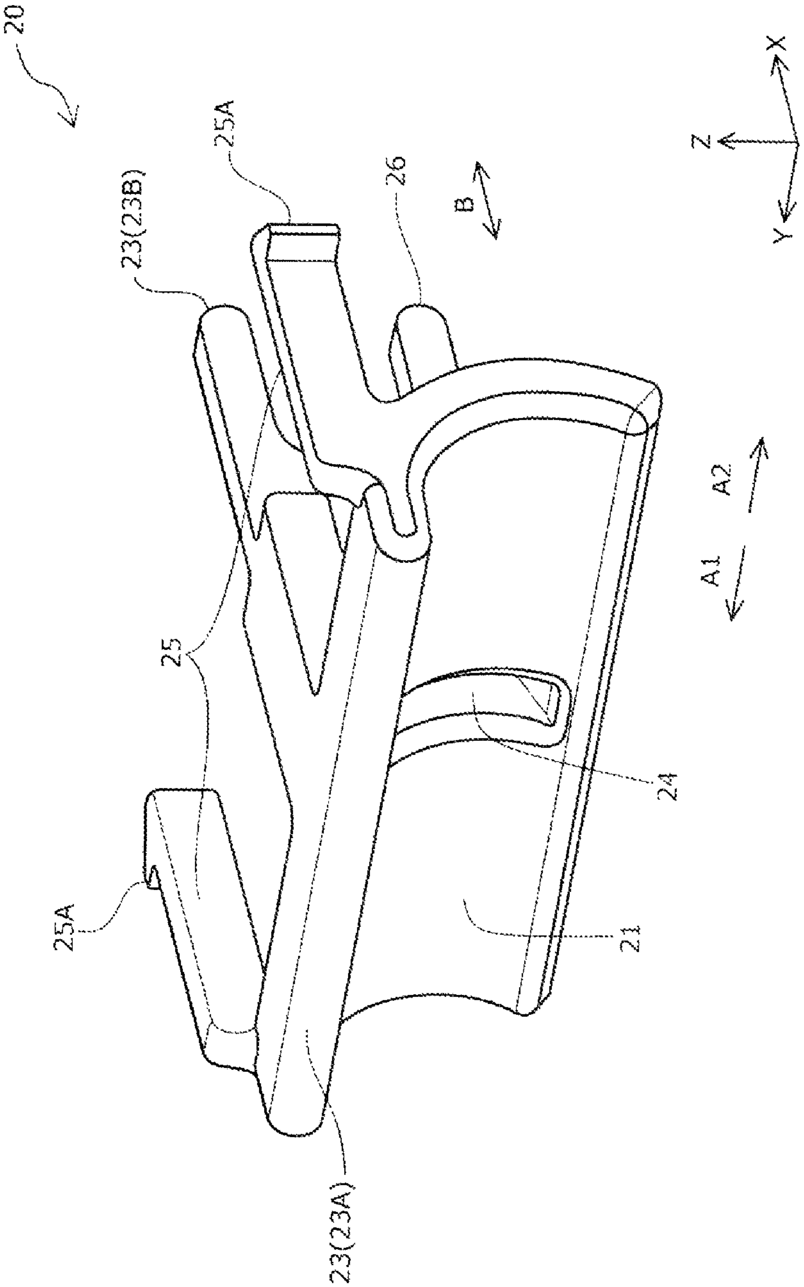
FIG. 8 is a perspective view of the sandwiching member of the recording device of FIG. 1.
Figure 9:
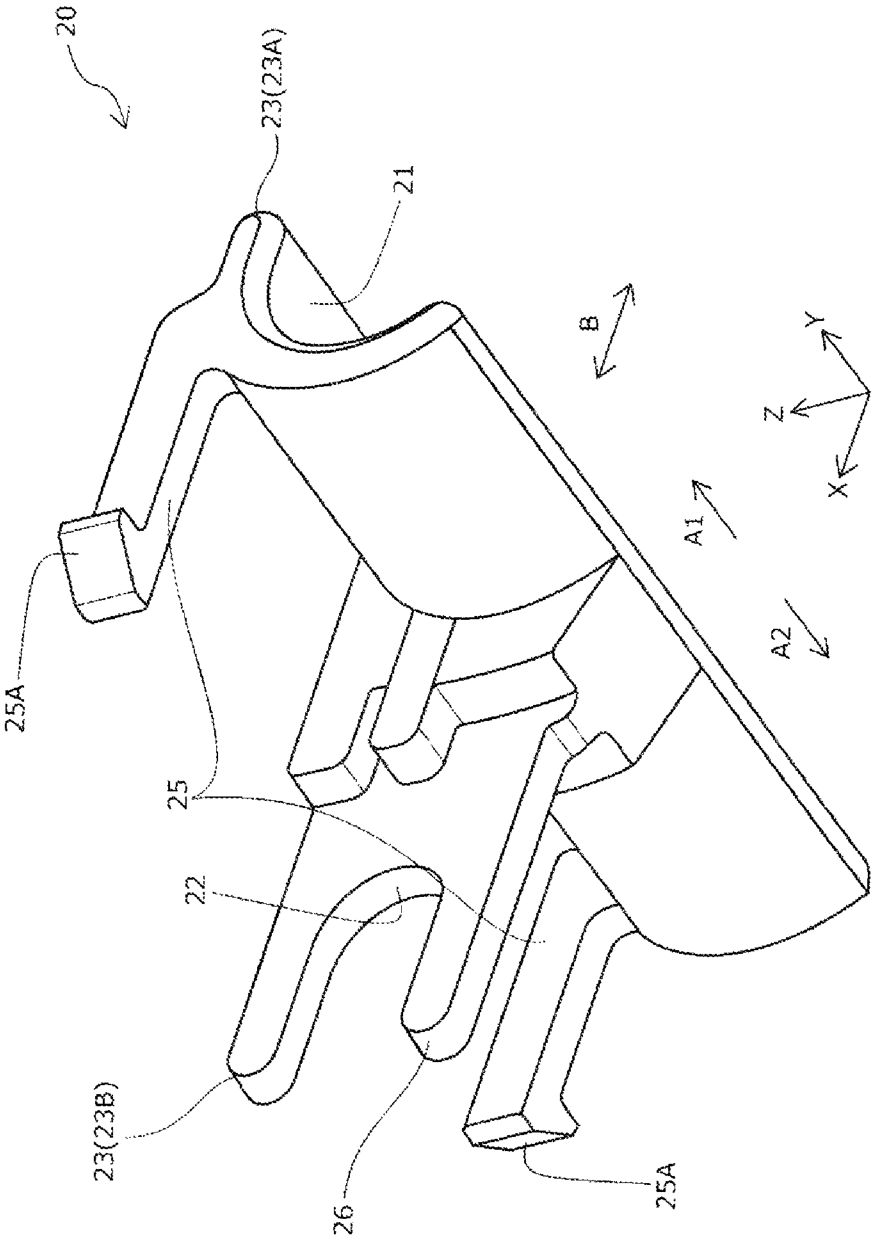
FIG. 9 is a perspective view of the sandwiching member of the recording device of FIG. 1 when seen in a direction different from that of FIG. 8.

Additionally, in the recording device 1 according to the example, as illustrated in FIGS. 7 to 9, an eaves portion 23A and an eaves portion 23B are provided in the sandwiching member 20. In this way, an eaves portion 23 coming into contact with at least one of the first guide shaft 13 and the cam member 30 and protruding in the Y-axis direction may be provided at the sandwiching member 20 vertically above at least one of the first guide shaft 13 and the cam member 30 when seen in the width direction B. With such a configuration, dislodging and falling of the sandwiching member 20 from the device can be curbed. Note that in the example, the eaves portion 23 is provided vertically above both the first guide shaft 13 and the cam member 30, but may be provided vertically above only one.

Additionally, in the recording device 1 according to the example, a protruding portion 26 is provided at the sandwiching member 20, as illustrated in FIGS. 7 to 9. In this way, the protruding portion 26 protruding in the Y-axis direction may be provided at a position facing the eaves portion 23 vertically below at least one of the first guide shaft 13 and the cam member 30 when seen in the width direction B. With such a configuration, at least one of the first guide shaft 13 and the cam member 30 can be vertically sandwiched between the eaves portion 23 and the protruding portion 26, and dislodging and falling of the sandwiching member 20 from the device and position displacement of the first guide shaft 13 and the cam member 30 relative to the sandwiching member 20 can be particularly effectively curbed. Note that in the example, the protruding portion 26 is provided only at a position facing the eaves portion 23B, but the protruding portion 26 may be provided only at a position facing the eaves portion 23A and, may be provided both at positions facing the eaves portion 23A and at positions facing the eaves portion 23B.

Note that the recording device 1 according to the example includes a cap (not illustrated) as a maintenance unit of the head 8. When the head 8 is capped with the cap, the posture of the carriage 9 changes. At this time, the sandwiching member 20 may have a gap in the Y-axis direction relative to the first guide shaft 13 and the cam member 30. However, by providing the protruding portion 26 and the eaves portion 23, dislodging and falling of the sandwiching member 20 from the device before and after the head 8 is capped with the cap can be particularly effectively curbed.

Additionally, in the recording device 1 of the example, as illustrated in FIGS. 7 and 8, the sandwiching member 20 includes a lubricant accommodation portion 24 configured to accommodate a lubricant that improves sliding properties between the first guide shaft 13 and the guide shaft-side contact surface 21. With such a configuration, the recording device 1 according to the example has a configuration in which the lubricant gradually leaks from the lubricant accommodation portion 24 to between the first guide shaft 13 and the guide shaft-side contact surface 21. Additionally, as described below, the sandwiching member 20 is attachable and detachable, and can be detached to replenish the lubricant, and thus the maintenance of the device can be facilitated.

Figure 6:
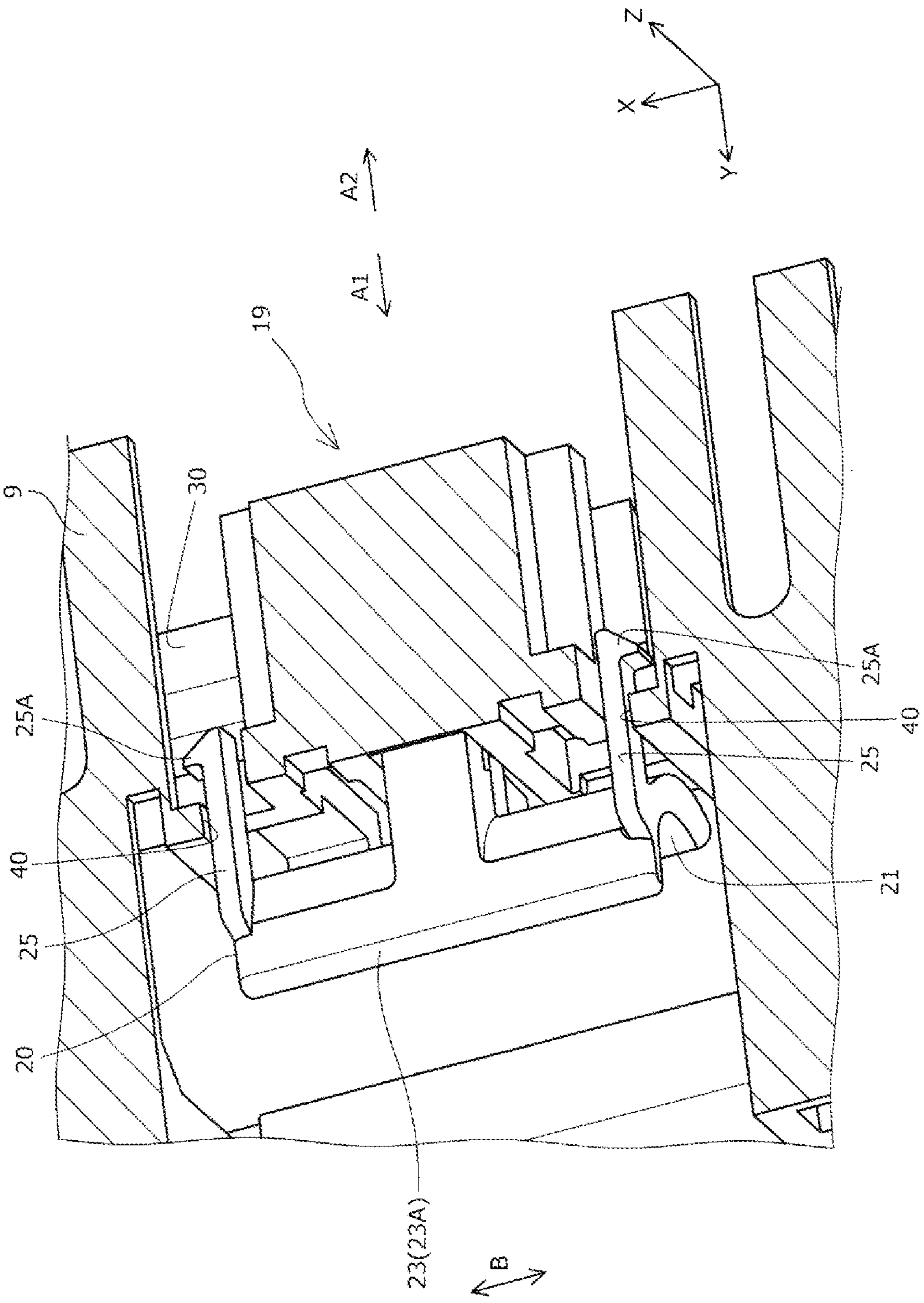
FIG. 6 is a perspective cross-sectional view illustrating a mounting portion of a sandwiching member to the carriage of the recording device of FIG. 1.

Additionally, in the recording device 1 according to the example, as illustrated in FIG. 6 that illustrates a mounting portion 19 of the sandwiching member 20 to the carriage 9, a snap-fit structure 25 is provided at the sandwiching member 20. Specifically, a hole 40 having an inward protrusion that can pass therethrough from the −Y direction to the +Y direction is provided in the carriage 9, and the snap-fit structure 25 has an engagement portion 25A that can pass through the hole 40 and engages with the protrusion of the hole 40 when the sandwiching member 20 is moved in the −Y direction after the engagement portion 25A passes through the hole 40 With such a configuration, the sandwiching member 20 can move within a desired range relative to the carriage 9 in the Y-axis direction, and can be easily attached to and detached from the carriage 9.

Figure 10:
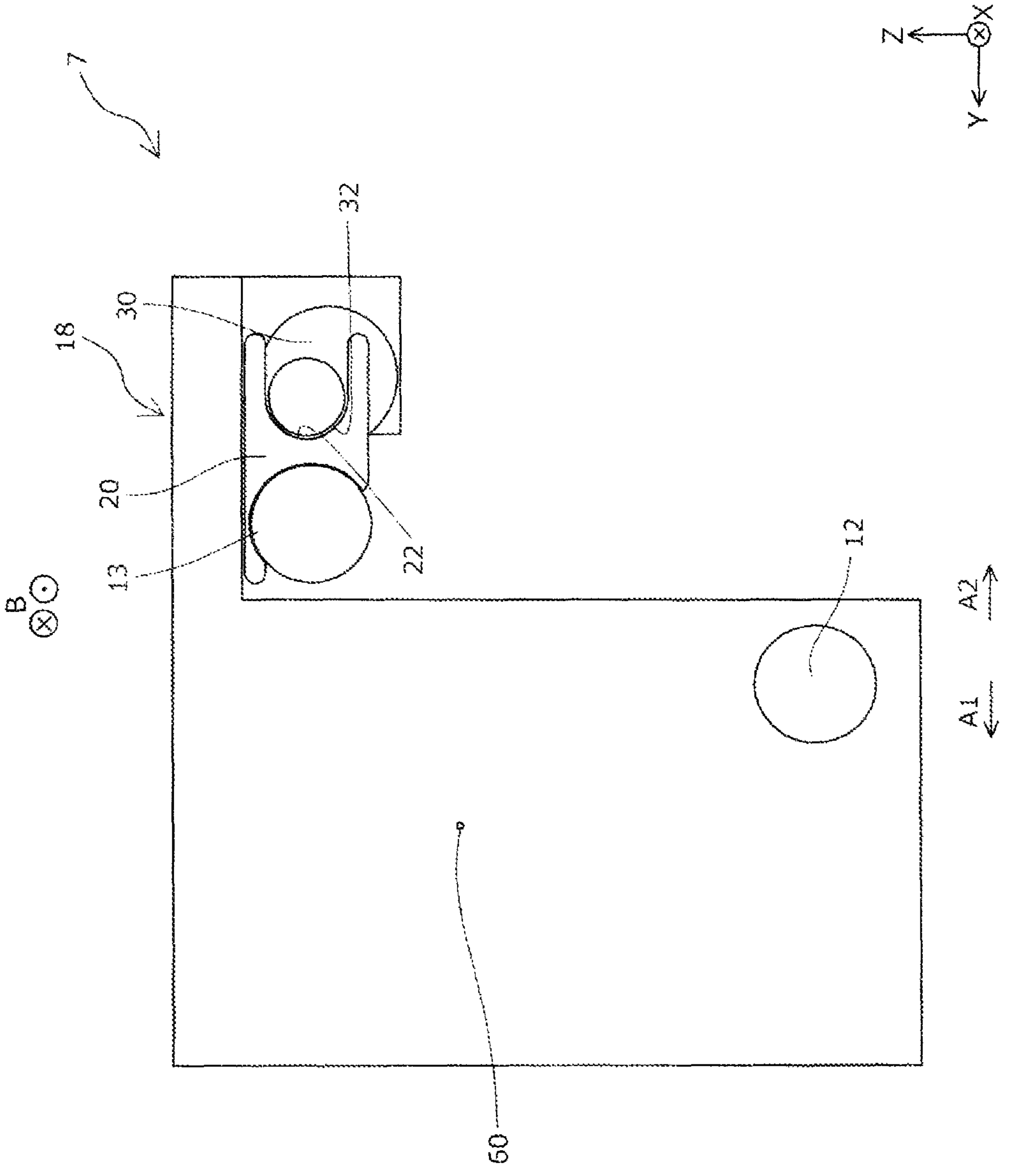
FIG. 10 is a schematic view illustrating the periphery of the carriage of the recording device of FIG. 1.

Here, as illustrated in FIG. 10, the posture change unit 18 is located on the −Y direction side of a center of gravity position 60 of the carriage 9. The cam member 30 presses the sandwiching member 20 to the +Y direction side. In other words, a pressing direction of the second curved surface 32 against the first curved surface 22 in the Y-axis direction is the +Y direction toward the center of gravity position 60 of the carriage 9 of the Y-axis direction when viewed in the width direction B as illustrated in FIG. 10. That is, in the recording device 1 of the example, since the cam member 30 is engaged with the carriage 9, the cam member 30 presses the carriage 9 via the sandwiching member 20 in a direction (the −Y direction in the Y-axis direction) opposite to a direction (the +Y direction in the Y-axis direction) in which the posture tends to change due to a weight of the carriage 9. Thus, the recording device 1 according to the example can curb a change in the posture of the carriage 9 in a direction not intended. However, the present disclosure is not limited to such a configuration.

Example 2

Figure 11:
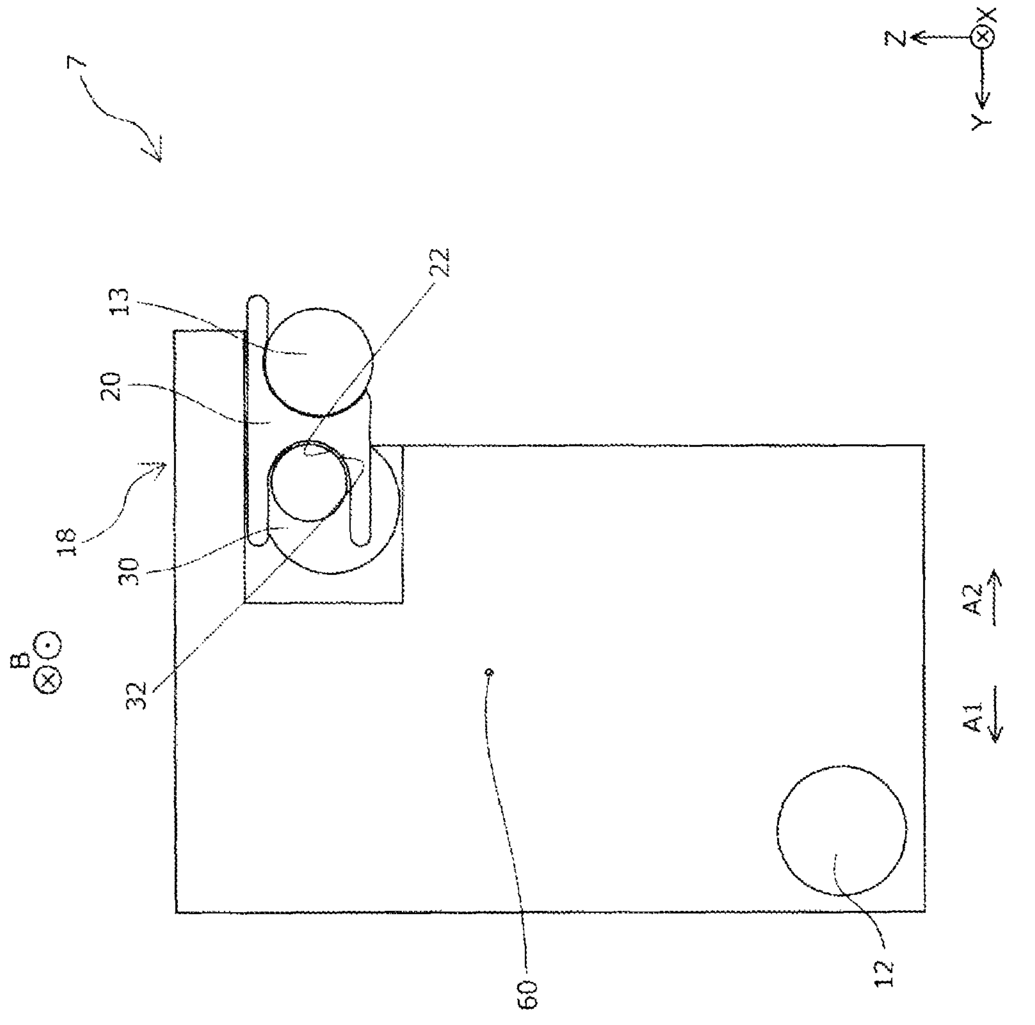
FIG. 11 is a schematic view illustrating the periphery of a carriage of a recording device according to Example 2 of the present disclosure.

Hereinafter, a recording device 1 according to Example 2 will be described with reference to FIG. 11. Note that FIG. 11 is a view corresponding to FIG. 10 in the recording device 1 of Example 1. Additionally, the recording device 1 of the example is the same as or similar to the recording device 1 of Example 1 except for the configuration described below, and thus has features the same as or similar to those of the recording device 1 of Example 1. Accordingly, in FIG. 11, components common to those in Example 1 are denoted by identical reference signs, and detailed descriptions thereof will be omitted.

As described above, in the recording device 1 of Example 1, the pressing direction of the second curved surface 32 against the first curved surface 22 in the Y-axis direction is the +Y direction toward the center of gravity position 60 of the carriage 9 of the Y-axis direction when viewed in the width direction B as illustrated in FIG. 10. On the other hand, in the recording device 1 of the example, the pressing direction of the second curved surface 32 against the first curved surface 22 in the Y-axis direction is the −Y direction that is a direction opposite to the direction toward the center of gravity position 60 of the carriage 9 of the Y axis direction when seen in the width direction B as illustrated in FIG. 11. With such a configuration, for example, a thickness of the carriage 9 in the Y-axis direction can be reduced, and a size of the carriage 9 can be reduced.

Additionally, in the recording device 1 of Example 1 and the recording device 1 of the example, the first curved surface 22 is a concave curved surface, and the second curved surface 32 is a convex curved surface. With such a configuration, a recording device having a smaller and simpler configuration than that of a recording device in which the first curved surface 22 is a convex curved surface and the second curved surface 32 is a concave curved surface can be easily manufactured. However, the present disclosure is not limited to the above configuration.

Example 3

Figure 12:
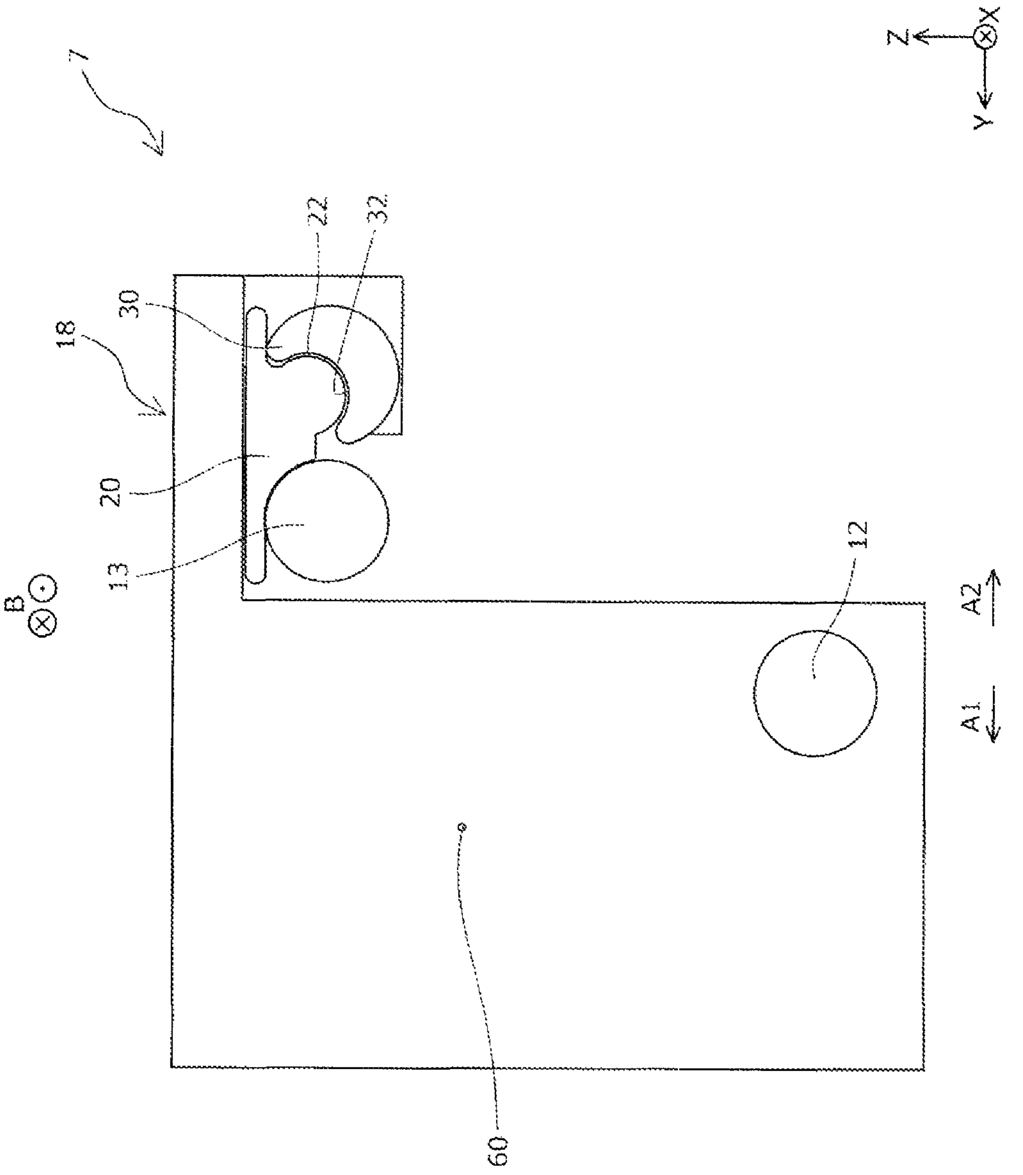
FIG. 12 is a schematic view illustrating the periphery of a carriage of a recording device according to Example 3 of the present disclosure.

Hereinafter, a recording device 1 of Example 3 will be described with reference to FIG. 12. Note that FIG. 12 is a view corresponding to FIG. 10 in the recording device 1 of Example 1. Additionally, the recording device 1 of the example is the same as or similar to the recording device 1 of Example 1 and the recording device 1 of Example 2 except for the configuration described below, and thus has features the same as or similar to those of the recording device 1 of Example 1 and the recording device 1 of Example 2. Accordingly, in FIG. 12, components common to those in Example 1 and Example 2 are denoted by identical reference signs, and detailed descriptions thereof will be omitted.

As described above, in the recording devices 1 of Example 1 and Example 2, as illustrated in FIGS. 10 and 11, the first curved surface 22 is a concave curved surface, and the second curved surface 32 is a convex curved surface. On the other hand, in the recording device 1 of the example, as illustrated in FIG. 12, the first curved surface 22 is a convex curved surface, and the second curved surface 32 is a concave curved surface. In this way, the present disclosure can configure the sandwiching member 20 and the cam member 30 in a variety of shapes.

The present disclosure is not limited to the examples described above, and can be realized in various configurations without departing from the gist of the present disclosure. Appropriate replacements or combinations may be made to the technical features in the examples which correspond to the technical features in the aspects described in the summary section to solve some or all of the problems described above or to achieve some or all of the advantageous effects described above. Additionally, when the technical features are not described herein as essential technical features, such technical features may be deleted appropriately.

What is claimed is:

1. A recording device comprising:

a head configured to discharge a liquid;

a carriage provided with the head and configured to reciprocate in a first direction;

a first guide shaft configured to support the carriage reciprocably in the first direction;

a sandwiching member disposed between the carriage and the first guide shaft in a second direction intersecting the first direction, the sandwiching member including a guide shaft-side contact surface formed on a first guide shaft side in the second direction and coming into contact with the first guide shaft and a first curved surface formed on a side opposite to that of the guide shaft-side contact surface in the second direction; and a cam member including a second curved surface slidably fitted to the first curved surface, the cam member being configured to rotate about the first direction as a rotation axis relative to the carriage in a state of being engaged with the carriage, wherein the cam member changes a position of the carriage relative to the sandwiching member in the second direction by pressing the first curved surface with the second curved surface in the second direction along with rotation of the cam member to change a distance in the second direction of a position at which the second curved surface presses the first curved surface relative to the rotation axis.

2. The recording device according to claim 1, further comprising a second guide shaft provided at a position different from that of the first guide shaft and configured to support the carriage reciprocably in the first direction, wherein the carriage rotates about the second guide shaft as a rotation axis as the cam member changes a position of the carriage relative to the sandwiching member.

3. The recording device according to claim 1, wherein a curvature of the second curved surface is the same curvature as the curvature of the first curved surface.

4. The recording device according to claim 1, wherein the sandwiching member comes into contact with the second curved surface at a constant position at the first curved surface regardless of the rotation of the cam member.

5. The recording device according to claim 1, wherein the sandwiching member is disposed at one position in a central region of three equal regions obtained by dividing the carriage into three equal portions in the first direction.

6. The recording device according to claim 1, wherein the first curved surface is a concave curved surface, and the second curved surface is a convex curved surface.

7. The recording device according to claim 1, wherein a pressing direction of the second curved surface against the first curved surface in the second direction is a direction toward a center of gravity position of the carriage in the second direction when seen in the first direction.

8. The recording device according to claim 1, wherein the first guide shaft is made of a material less likely to wear than that of the sandwiching member.

9. The recording device according to claim 1, wherein an eaves portion coming into contact with at least one of the first guide shaft and the cam member and protruding in the second direction is provided at the sandwiching member vertically above at least one of the first guide shaft and the cam member when seen in the first direction.

10. The recording device according to claim 9, wherein a protruding portion protruding in the second direction is provided at a position facing the eaves portion vertically below at least one of the first guide shaft and the cam member when seen in the first direction.

11. The recording device according to claim 1, wherein the sandwiching member includes a lubricant accommodation portion configured to accommodate a lubricant that improves sliding properties between the first guide shaft and the guide shaft-side contact surface.

* * * * *